US008928994B2

(12) United States Patent
Ota

(10) Patent No.: US 8,928,994 B2
(45) Date of Patent: Jan. 6, 2015

(54) LENS BARREL AND IMAGING DEVICE

(75) Inventor: Hidefumi Ota, Kawasaki (JP)

(73) Assignee: Nikon Corporation, Tokyo (JP)

( * ) Notice: Subject to any disclaimer, the term of this patent is extended or adjusted under 35 U.S.C. 154(b) by 31 days.

(21) Appl. No.: 13/126,939

(22) PCT Filed: Nov. 5, 2009

(86) PCT No.: PCT/JP2009/005882
§ 371 (c)(1),
(2), (4) Date: Jul. 18, 2011

(87) PCT Pub. No.: WO2010/052910
PCT Pub. Date: May 14, 2010

(65) Prior Publication Data
US 2011/0286110 A1 Nov. 24, 2011

(30) Foreign Application Priority Data

Nov. 7, 2008 (JP) ................. 2008-286929

(51) Int. Cl.
*G02B 15/14* (2006.01)
*G02B 7/10* (2006.01)
*G03B 3/10* (2006.01)
*G03B 13/34* (2006.01)
*G03B 17/04* (2006.01)

(52) U.S. Cl.
CPC *G02B 7/102* (2013.01); *G03B 3/10* (2013.01); *G03B 13/34* (2013.01); *G03B 17/04* (2013.01)
USPC ........................................................ 359/694

(58) Field of Classification Search
CPC ........ G02B 7/102; G03B 13/34; G03B 17/04; G03B 3/10
USPC .......... 359/691, 692, 703, 704, 823, 824, 694
See application file for complete search history.

(56) References Cited

U.S. PATENT DOCUMENTS

| 8,023,212 B2 * | 9/2011 | Kudoh ........................ 359/823 |
| 2002/0006280 A1 * | 1/2002 | Tanioka ........................ 396/79 |

FOREIGN PATENT DOCUMENTS

| JP | A-02-25815 | 1/1990 | |
| JP | 2001264616 A * | 9/2001 | ............... G02B 7/08 |

(Continued)

OTHER PUBLICATIONS

Aug. 21, 2012 Japanese Office Action issued in Application No. JP-A-2008-286929 (with translation).

(Continued)

*Primary Examiner* — William Choi
*Assistant Examiner* — Sharrief Broome
(74) *Attorney, Agent, or Firm* — Oliff PLC

(57) ABSTRACT

The lens barrel has a first lens unit that is disposed at the object side and changeable between a first state, a spacing of the lenses is a predetermined spacing, and a second state, the spacing of the lenses is narrower than in the first state; a second lens unit that is disposed at the image side and capable of changing a focusing state by moving along the optical axis; a restricting member that restricts the change of the first lens unit from the first state to the second state; and driving unit that, in a state in which the change to the second state is restricted by the restricting member, moves the second lens unit toward the image side, wherein the restricting member releases the restriction in association with a completion of the movement of the second lens unit by the driving means.

8 Claims, 10 Drawing Sheets

(56) References Cited

FOREIGN PATENT DOCUMENTS

| | | | | |
|---|---|---|---|---|
| JP | A-2001-264616 | | 9/2001 | |
| JP | 2002202547 A | * | 7/2002 | ............. G03B 11/04 |
| JP | A-2002-202547 | | 7/2002 | |
| JP | 2006091386 | * | 4/2006 | ............... G02B 7/02 |
| JP | 2006091386 A | * | 4/2006 | ............... G02B 7/02 |
| JP | A-2006-091386 | | 4/2006 | |

OTHER PUBLICATIONS

International Search Report issued in corresponding International Application No. PCT/JP2009/005882 dated Jan. 19, 2010 (with translation).

* cited by examiner

LENS BARREL AND IMAGING DEVICE

TECHNICAL FIELD

The present invention relates to a lens barrel and an imaging device equipped therewith.

BACKGROUND ART

Heretofore, a zoom lens barrel has been known (for example, see Patent Reference 1) that, in order to improve portability of the lens barrel and storability when not in use, is capable of narrowing spacings between lenses to reduce the length of the lens barrel.

[Patent Document 1] Japanese Unexamined Patent Application, Publication No. H02-25815

DISCLOSURE OF THE INVENTION

Problems to be Solved by the Invention

However, in a lens barrel in which a focusing lens is disposed at the image side relative to a zoom lens, when the focusing lens is disposed at the object side of the optical system in a structure in which the zoom lens is withdrawn to reduce the barrel length, there is a possibility that the zoom lens and the focusing lens may collide when the barrel length is retracted.

An object of the present invention is to provide a lens barrel and imaging device that may avoid a collision between lenses when the length of the lens barrel is reduced.

Means for Solving the Problems

The present invention achieves, this object with the solution described below.

The invention described in claim 1 is a lens barrel comprising: a first lens unit that is disposed at the object side in an optical system formed with a plurality of lenses and that is changeable between a first state, in which a spacing of the plurality of lenses along an optical axis direction of the optical system is a predetermined spacing, and a second state, in which the spacing of the plurality of lenses is narrower than in the first state; a second lens unit that is disposed at the image side in the optical system relative to the first lens unit and that is capable of changing a focusing state of the optical system by moving along the optical axis of the optical system; a restricting member that restricts the change of the first lens unit from the first state to the second state; and driving unit that, in a state in which the change to the second state is restricted by the restricting member, moves the second lens unit toward the image side of the optical system, wherein the restricting member releases the restriction in association with a completion of the movement of the second lens unit by the driving means.

The invention described in claim 2 is the lens barrel according to claim 1, further comprising: a first operation member that, when operated, changes the first lens unit from the first state to the second state; and a second operation member that, when operated in a state in which the change by the first operation member is restricted by the restricting member, starts the driving means and moves the second lens unit.

The invention described in claim 3 is the lens barrel according to claim 2, wherein the first operation member changes the first lens unit from the first state to the second state by turning in a first direction about the optical axis of the optical system, and the second operation member includes an engaging portion and is capable of restricting the turning of the first operation member in the first direction by the engaging portion abutting against the restricting member.

The invention described in claim 4 is the lens barrel according to claim 3, wherein, when the second operation member is operated in a second direction that is different from the first direction, the driving unit drives the second lens unit in association with the engagement of the engaging portion with the restricting member being released.

The invention described in claim 5 is the lens barrel according to claim 3, wherein the restricting member includes a first restricting member that is abuttable against the engaging portion and a second restricting member that is disposed to be offset in the first direction from a position of abutting between the first restricting member and the engaging portion.

The invention described in claim 6 is the lens barrel according to claim 5, wherein the engagement of the engaging portion with the first restricting member is releasable by operation of the second operation member in the second direction and, after the engagement of the engaging portion with the first restricting member is released, the engaging portion engages with the second restricting member.

The invention described in claim 6 is the lens barrel according to claim 6, wherein the engagement of the engaging portion with the second restricting member is released in association with the completion of the movement of the second lens unit toward the image side.

The invention described in claim 8 is the lens barrel according to claim 7, further comprising a regulation portion that, after the engagement of the engaging portion with the second restricting member is released, regulates the turning of the first operation member in the first direction by engaging with the engaging portion.

The invention described in claim 9 is an imaging device comprising a lens barrel according to claim 1.

The structure described above may be suitably modified and at least portions thereof may be replaced with other structures.

Effects Of The Invention

According to the present invention, a lens barrel and imaging device capable of avoiding a collision between lenses when the length of the lens barrel is shortened may be provided.

PREFERRED MODE FOR CARRYING OUT THE INVENTION

Figure 1:
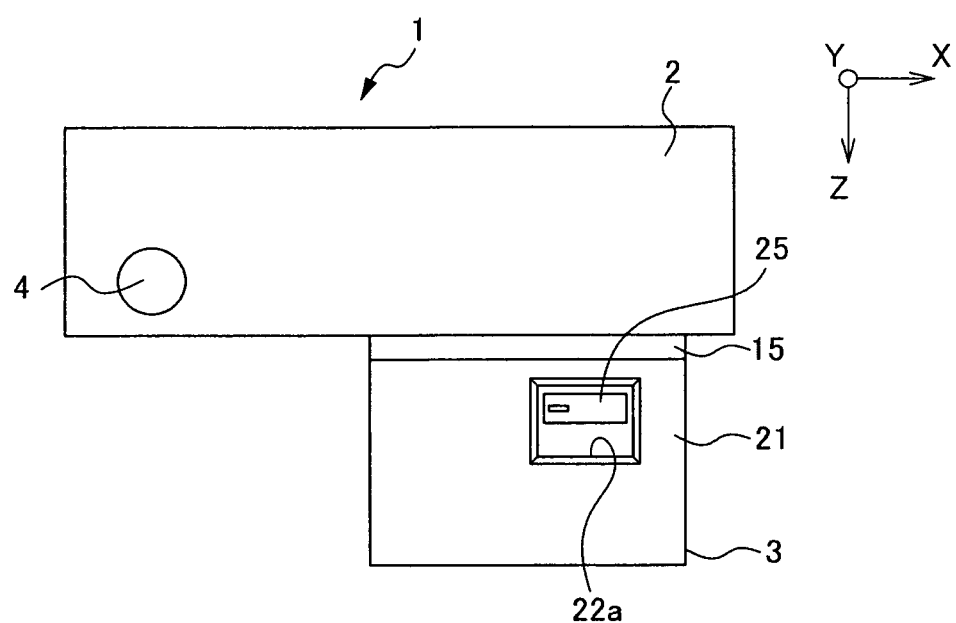
FIG. 1 is a plan view of a camera equipped with a lens barrel of an exemplary embodiment.

Herebelow, an exemplary embodiment of the present invention is described with reference to the attached drawings and suchlike. In the drawings referred to herebelow, an orthogonal XYZ co-ordinate system is provided in order to facilitate description and understanding. In this co-ordinate system, for a position of the camera when a photographer is keeping an optical axis A horizontal and photographing a landscape orientation image (hereinafter referred to as a usual position), a direction to leftward from the photographer's point of view is the +X direction. The direction to upward in the usual position is the +Y direction, and the direction toward the object in the usual position is the +Z direction.

Figure 2:
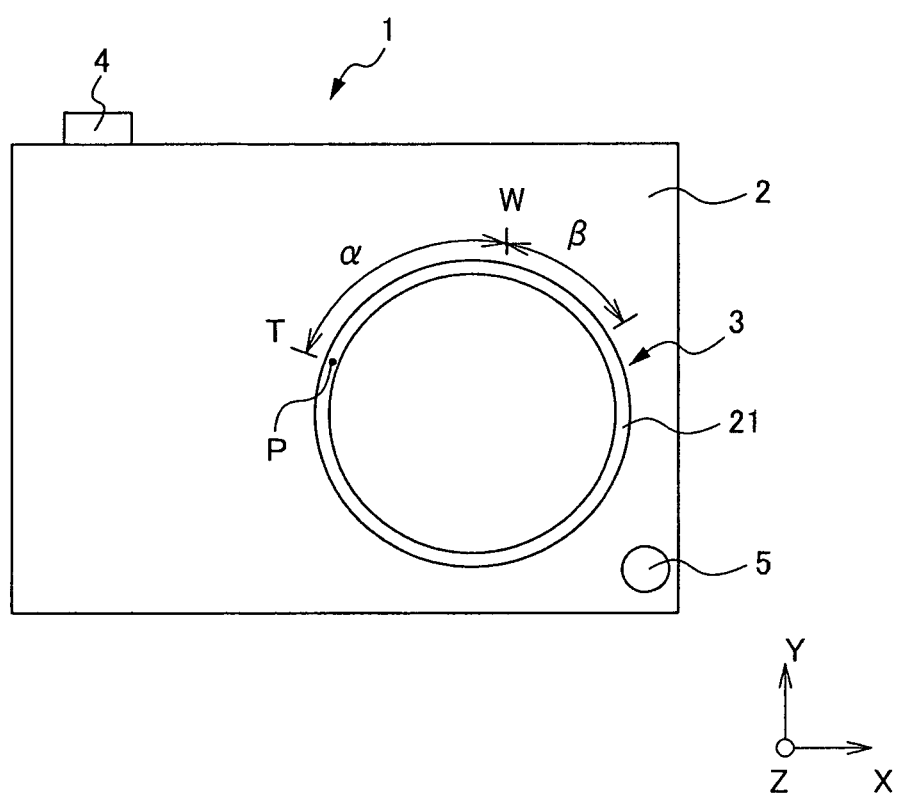
FIG. 2 is a front view of the camera equipped with the lens barrel of the exemplary embodiment.

FIG. 1 and FIG. 2 show a lens-interchangeable type camera 1 in which the exemplary embodiment of the present invention is employed. The camera 1 is equipped with a camera body 2 and a lens barrel 3 that is detachably mounted to a front face of the camera body 2. The lens barrel 3 is an interchangeable lens that is interchangeable on the camera body 2.

The camera body 2 includes a mirror unit, a shutter, an imaging section, a liquid crystal display panel, a finder, a control section that performs different kinds of control, and the like. These are not shown in any of the drawings. As illustrated in FIG. 1, a release button 4 that is operated by pressing at a time of imaging is provided at the top face of the camera body 2. As illustrated in FIG. 2, a lens release button 5 is provided at a position of the front face of the camera body 2 that is close to the lens barrel 3. The lens release button 5 is an operation button for detaching the lens barrel 3 from the camera body 2.

Figure 3:
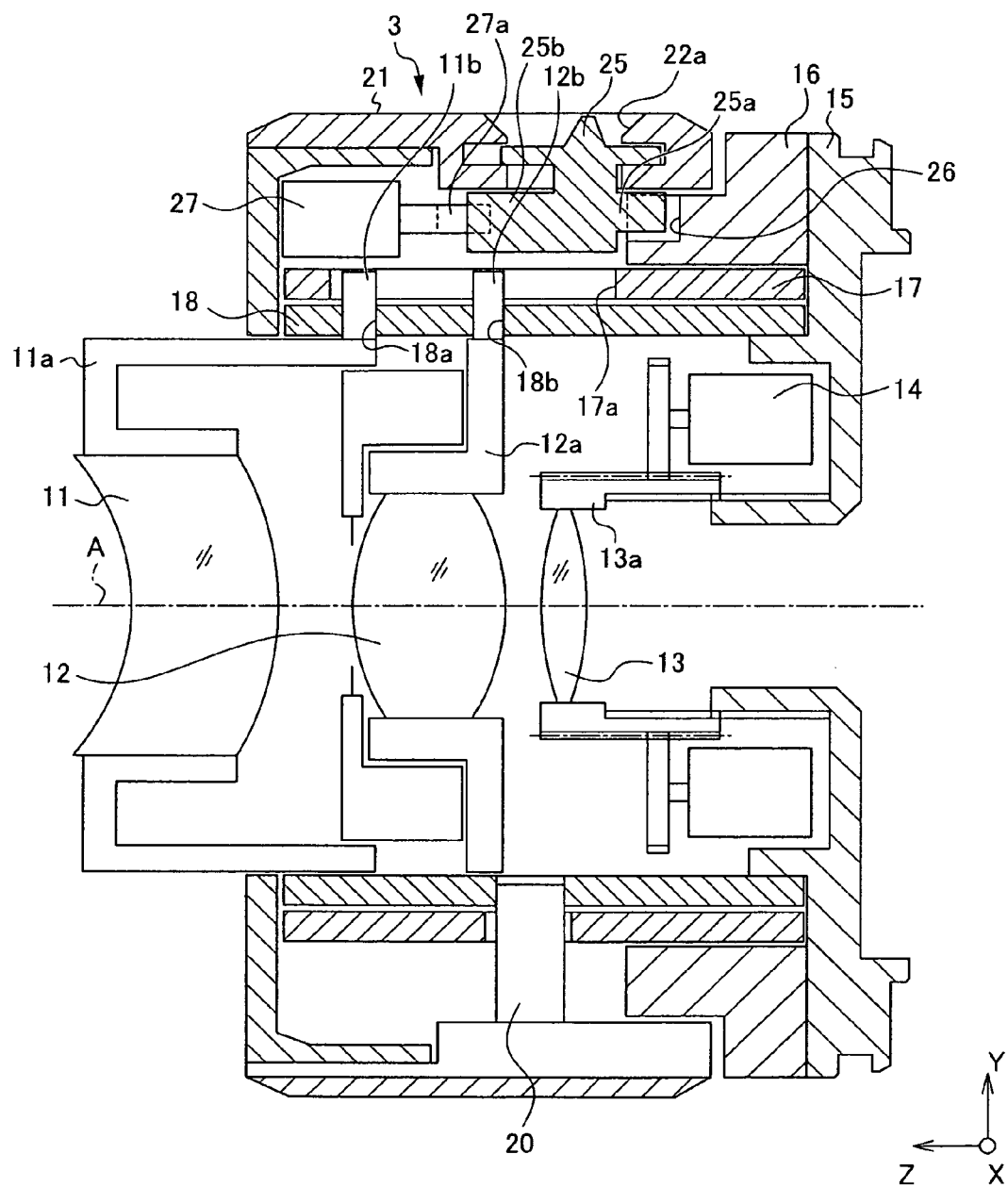
FIG. 3 is a sectional diagram illustrating the lens barrel of the exemplary embodiment of the present invention.
Figure 4:
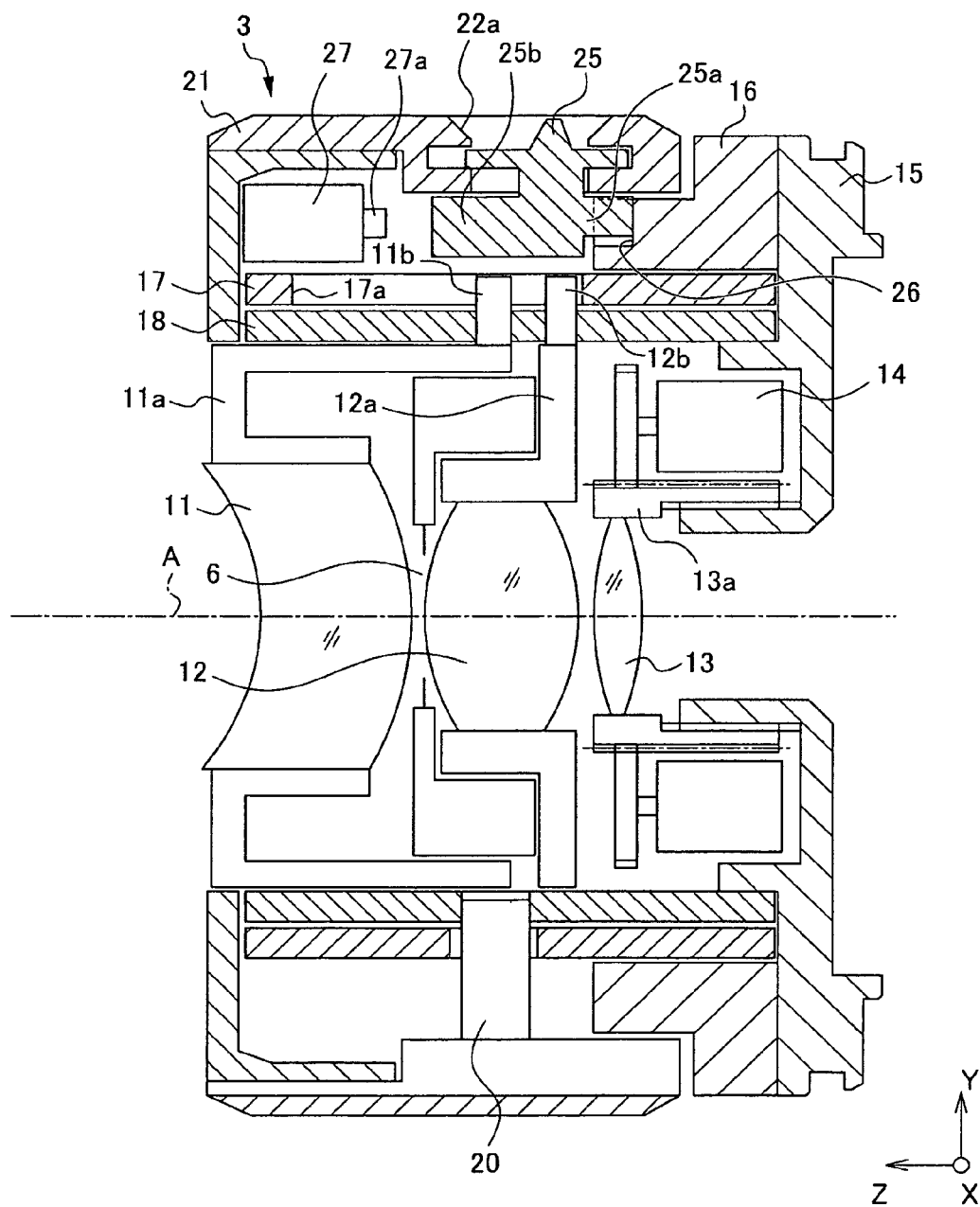
FIG. 4 is a sectional diagram illustrating a retracted state of the lens barrel of the exemplary embodiment.

FIG. 3 and FIG. 4 show sectional diagrams of the lens barrel 3. FIG. 3 shows a state in which an image may be focused at an imaging surface of the imaging section, and FIG. 4 shows a state in which an image may not be focused at the imaging surface of the imaging section.

As illustrated in FIG. 3 and FIG. 4, the lens barrel 3 includes a mounting portion 15 for attachment to the camera body 2, a fixed tube 16 that is fixed at a front side (+Z side) of the mounting portion 15, and a zoom ring 21 that is turnable relative to the fixed tube 16. The zoom ring 21 is a tube that constitutes the exterior of the lens barrel 3. The lens barrel 3 is lengthened and shortened by the zoom ring 21 being operated by turning. A translation key 17 and a cam tube 18 are provided inside the zoom ring 21 and the fixed tube 16.

In the lens barrel 3, a first lens unit 11, a second lens unit 12 and a third lens unit 13 are arranged in this order along the optical axis A from the object side towards the image side. These lens units 11, 12 and 13 are retained by lens frames 11a, 12a and 13a, respectively.

The first lens unit 11 and the second lens unit 12 function as a zoom lens. Cam pins 11b and 12b are joined to the lens frame 11a of the first lens unit 11 and the lens frame 12a of the second lens unit 12. The cam pins 11b and 12b engage with the cam tube 18 and the translation key 17, and are moved along the optical axis A by rotary driving when the zoom ring 21 is operated by turning. Thus, the first lens unit 11 and the second lens unit 12 move linearly along the optical axis A.

In FIG. 2, "P" is a mark formed on a side face of the zoom ring 21, and indicates a current state of the lens barrel 3. FIG. 2 illustrates a state in which the lens barrel 3 is at a Tele position (T). In a state in which focusing is possible, the zoom ring 21 may be operated by turning between the Tele position (T) and a Wide position (W) (in a region α) shown in FIG. 2. When the zoom ring 21 is operated by turning in this region α, the first lens unit 11 and the second lens unit 12 move along the optical axis A and a zoom operation is performed. A zoom ring linking portion 20 illustrated in FIG. 3 and FIG. 4 is provided in the zoom ring 21. When the zoom ring 21 is turned, the rotation is transmitted to the cam tube 18 by the zoom ring linking portion 20. The cam pins 11b and 12b are translated in the optical axis direction by the rotation of the cam tube 18, along cams 18a and 18b formed in the cam tube 18 and a translation groove 17a in the translation key 17. Thus, the first lens unit 11 and the second lens unit 12 may be moved in the direction of the optical axis A.

The third lens unit 13 functions as a focusing lens unit. The lens frame 13a of the third lens unit 13 is coupled to a focusing motor 14 by a gear coupling, and the third lens unit 13 is moved by driving of the focusing motor 14. The third lens unit 13, with the focusing motor 14 serving as a drive source, is driven independently from the first lens unit 11 and the second lens unit 12.

A retraction switch 25 for putting the barrel length of the lens barrel 3 into a retracted state is provided at the zoom ring 21. The retraction switch 25 is inserted into a notch portion 22a formed in the zoom ring 21. A portion of the retraction switch 25 is exposed through the notch portion 22a. A sliding operation of the retraction switch 25 may be performed through the notch portion 22a.

An unillustrated spring is disposed between the retraction switch 25 and the fixed tube 16. The retraction switch 25 is continuously urged in the −Z direction by this spring. Thus, when the retraction switch 25 is not being slide-operated, the retraction switch 25 is disposed at the −Z position illustrated in FIG. 1.

The retraction switch 25 includes a first protrusion 25a and a second protrusion 25b. The first protrusion 25a is formed so as to protrude to the camera body 2 side relative to the retraction switch 25 the −Z side, and the second protrusion 25b is formed so as to protrude to the object side the +Z side. A cam groove 26 is formed in the fixed tube 16 in correspondence with the first protrusion 25a, and a solenoid 27 is disposed in correspondence with the second protrusion 25b.

As illustrated in FIG. 5 to FIG. 10, the cam groove 26 is provided with an abutting portion 26a, a V-slot portion 26b and a lock slot portion 26c, in this order along a direction of turning E of a main body portion 22 of the zoom ring 21. The abutting portion 26a abuts against the first protrusion 25a, and turning of the zoom ring 21 is stopped by this abutting against the first protrusion 25a. The V-slot portion 26b is a portion to which the first protrusion 25a moves in the retracted state of the lens barrel 3. The first protrusion 25a fits into the lock slot portion 26c. Thus, the lock slot portion 26c locks the lens barrel 3 in the retracted state.

As illustrated in FIG. 3 and FIG. 4, the solenoid 27 is fixed at the inside of the zoom ring 21. A pin portion 27a of the solenoid 27 opposes the second protrusion 25b of the retraction switch 25. In an extended state, the pin portion 27a abuts against the second protrusion 25b, thus stopping a turning operation of the zoom ring 21. In a shortened state, the pin portion 27a does not abut against the second protrusion 25b, thus allowing a turning operation of the zoom ring 21. Driving of the solenoid 27 is controlled by an unillustrated control section.

The lens barrel 3 of the present exemplary embodiment is further provided with a detection means 31. A specific disposition location of the detection means 31 is not illustrated but, as illustrated in FIG. 5B, FIG. 6B, FIG. 7B, FIG. 8B, FIG. 9B and FIG. 10B, the detection means 31 includes a fixed terminal 31a and a movable terminal 31b. The fixed terminal 31a is provided at the fixed tube 16 and the movable terminal 31b is provided at the zoom ring 21. An unillustrated brush that protrudes toward the movable terminal 31b is provided at the fixed terminal 31a. Operation of the retraction switch 25 is detected by whether the brush is in contact or not in contact with the movable terminal 31b. A detection signal detected by the detection means 31 is outputted to the unillustrated control section.

Next, operation of the present exemplary embodiment from the state in which focusing is possible to the retracted state in which focusing is not possible is described in accordance with FIG. 5 to FIG. 10. Each of FIG. 5A, FIG. 6A, FIG. 7A FIG. 8A FIG. 9A and FIG. 10A shows operation of the retraction switch 25, and FIG. 5B, FIG. 6B, FIG. 7B, FIG. 8B, FIG. 9B and FIG. 10B show operations of the detection means 31 at the same times. The arrow E indicates the direction of turning of the zoom ring 21, including the main body portion 22. As illustrated in FIG. 2, when the zoom ring 21 carries out a turning operation, the zoom ring 21 moves between the region in which focusing is possible α, from the T position to the W position, and a retraction region β, which is a region in which focusing is not possible that is continuous from the region in which focusing is possible α, the boundary being the W position.

Figure 5A:
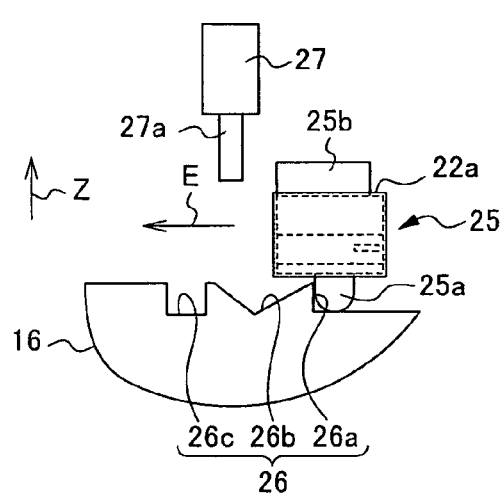
FIG. 5A is a partial plan diagram of a state in which a zoom ring is turned and FIG. 5B is a plan diagram illustrating operation of a detection means.
Figure 5B:
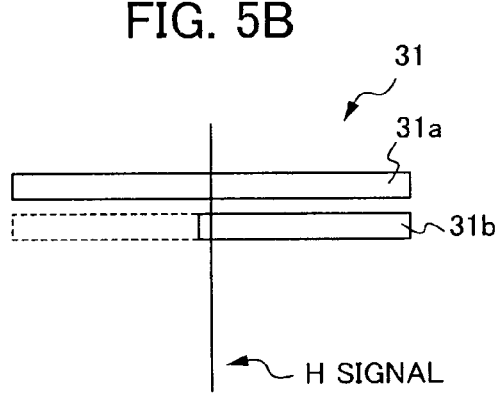

FIG. 5A shows a state in which the zoom ring 21 has been turned in the direction of arrow E from the T position and has reached the W position (FIG. 2). The first lens unit 11 and the second lens unit 12 are moved in the retraction direction (the −Z direction) by the turning of the zoom ring 21. The retraction switch 25 turns integrally with the turning of the zoom ring 21, and moves in the direction of arrow E. Because of this movement, the first protrusion 25a of the retraction switch 25 abuts against the abutting portion 26a of the fixed tube 16, and turning of the retraction switch 25 and zoom ring 21 as a whole is restricted. At this point in time, the detection means 31 has not detected movement of the movable terminal 31b. Therefore, the signal from the detection means 31 is high(H signal).

Because the first protrusion 25a of the retraction switch 25 abuts against the abutting portion 26a and limits turning of the zoom ring 21 in this manner, the zoom ring 21 does not turn any further. Therefore, the movement of the first lens unit 11 and second lens unit 12 constituting the zoom lens unit in the retraction direction (the −Z direction) stops, and these lens units 11 and 12 (i.e., the second lens unit 12) will not strike against the third lens unit 13 constituting the focusing lens unit.

Figure 6A:
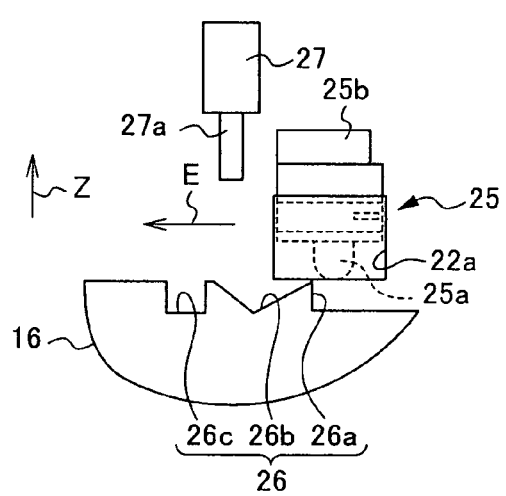
FIG. 6A is a partial plan diagram of a state in which the zoom ring is turned further from FIG. 5A
Figure 6B:
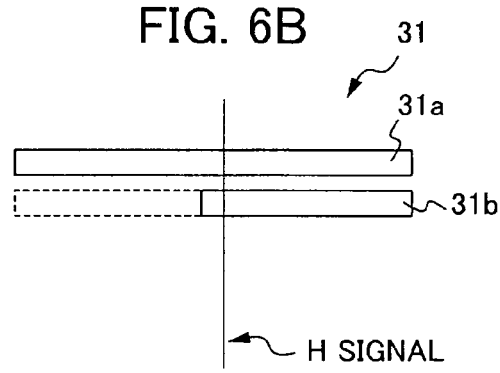
FIG. 6B is a plan diagram illustrating operation of the detection means.

After the turning of the zoom ring 21 stops, as illustrated in FIG. 6A, an operator slide-operates the retraction switch 25 in the +Z direction. The first protrusion 25a is disengaged from abutting against the abutting portion 26a by this sliding operation. Hence, the zoom ring 21 may be operated to turn in the direction of arrow E. At this time too, the movable terminal 31b is not detected and the signal from the detection means 31 is high (H signal).

Figure 7A:
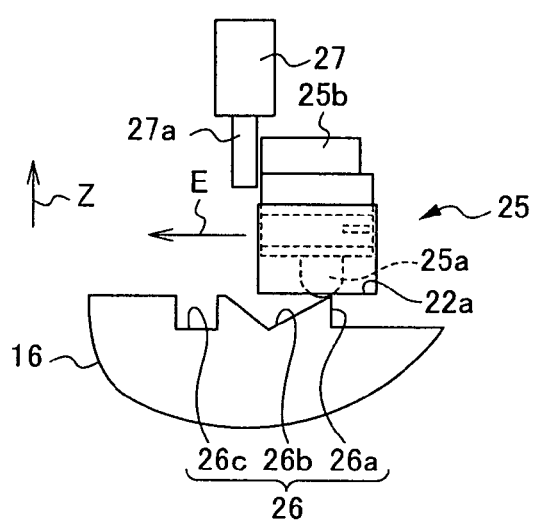
FIG. 7A is a partial plan diagram of a state in which the zoom ring is turned further from FIG. 6A
Figure 7B:
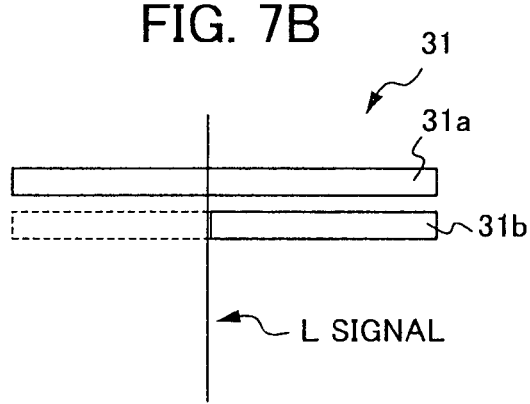
FIG. 7B is a plan diagram illustrating operation of the detection means.

FIG. 7A shows a state in which the retraction switch 25 has been slide-operated and the zoom ring 21 turned a little further in direction E from the state in FIG. 6A. The movable terminal 31b crosses a line that is the boundary between high (H) and low (L) signals, and the detection means 31 outputs a low (L) signal to the control section. When the low (L) signal is inputted, the control section controls the focusing motor 14 and starts rotation of the focusing motor 14. The third lens unit 13 is moved in the retraction direction (the −Z direction) along the direction of the optical axis A by the rotation of the focusing motor 14. During this operation, the second protrusion 25b of the retraction switch 25 abuts against the pin portion 27a of the solenoid 27. Therefore, the zoom ring 21 is in a turning regulation state in which turning thereof is stopped. Because the turning of the zoom ring 21 is regulated, the first lens unit 11 and the second lens unit 12 are in a state in which movement thereof is stopped. Therefore, the third lens unit 13 alone precedingly moves in the retraction direction.

The third lens unit 13 is withdrawn to the retracted position illustrated in FIG. 4 by the driving of the focusing motor 14. After this withdrawal is complete, the rotation of the focusing motor 14 stops. At the same time as the rotation of the focusing motor 14 stops, the solenoid 27 performs a shortening operation under the control of the control section, and thus withdraws the pin portion 27a. If the zoom ring 21 is turned back, turning in the opposite direction from the state in FIG. 7A, in response to the signal from the detection means 31 going high (H signal), the solenoid 27 performs an extending operation and the pin portion 27a abuts against the second protrusion 25b.

Figure 8A:
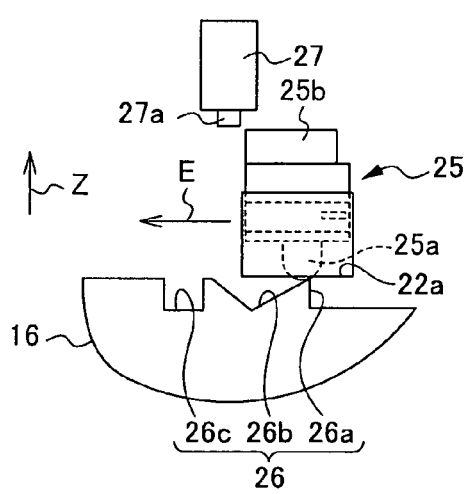
FIG. 8A is a partial plan diagram of a state in which the zoom ring is turned further from FIG. 7A
Figure 8B:
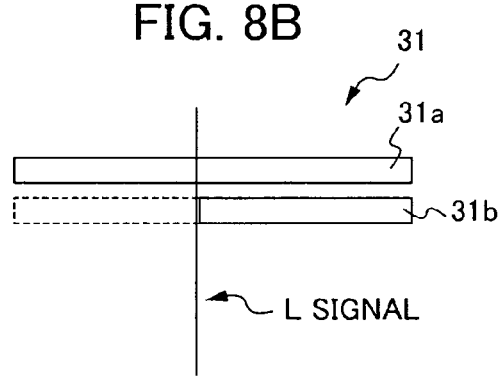
FIG. 8B is a plan diagram illustrating operation of the detection means.

FIG. 8A illustrates a state in which the solenoid 27 is shortened and the turning regulation is released. In this state, it is possible for the zoom ring 21 to turn further in the direction of arrow E from the W position (FIG. 2), and the zoom ring 21 may turn in the retraction region β illustrated in FIG. 2. Because of this turning of the zoom ring 21 in the direction of arrow E in the retraction region β, the first lens unit 11 and the second lens unit 12 move in the retraction direction along the optical axis A. Even though the lens units 11 and 12 are moving in the retraction direction, because the third lens unit 13 has already withdrawn to a barrel retraction position, the lens units 11 and 12 do not strike against the third lens unit 13. In FIG. 8A, when the zoom ring 21 is turned, the retraction switch 25 rides over the abutting portion 26a and moves to a position opposing the V-slot portion 26b.

Figure 9A:
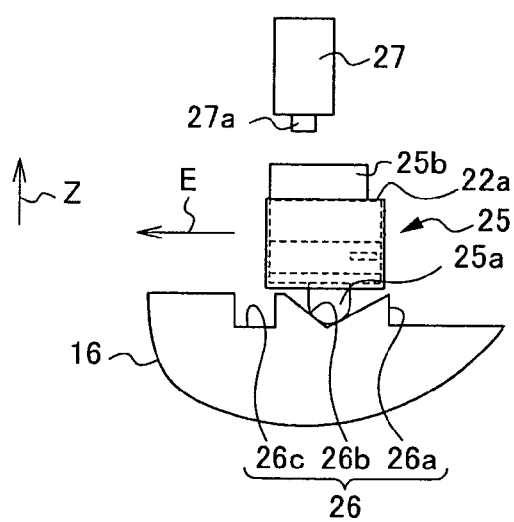
FIG. 9A is a partial plan diagram of a state in which the zoom ring is turned further from FIG. 8A
Figure 9B:
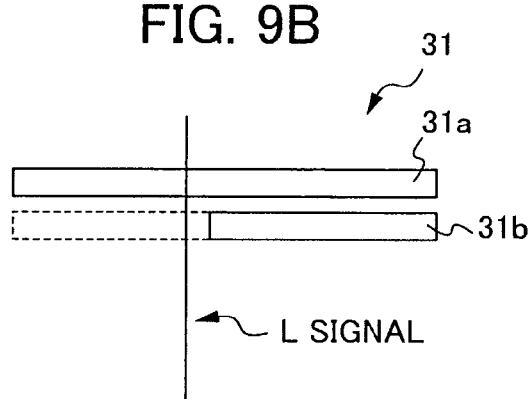
FIG. 9B is a plan diagram illustrating operation of the detection means.

FIG. 9A illustrates a stage partway between FIG. 8A and reaching FIG. 9A. In the state in FIG. 9A, if an operation force on the retraction switch 25 is released, the retraction switch 25 is urged to return to its initial position (FIG. 1) by the spring. Accordingly, the first protrusion 25a enters into the V-slot portion 26b. In this state, because the first protrusion 25a of the retraction switch 25 is in the V-slot portion 26b, the lens turns, which is not suitable for a lens exchange.

Figure 10A:
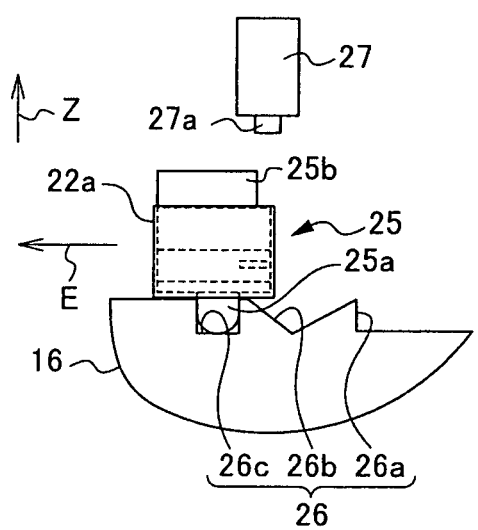
FIG. 10A is a partial plan diagram of a state in which the zoom ring is turned further from FIG. 9A
Figure 10B:
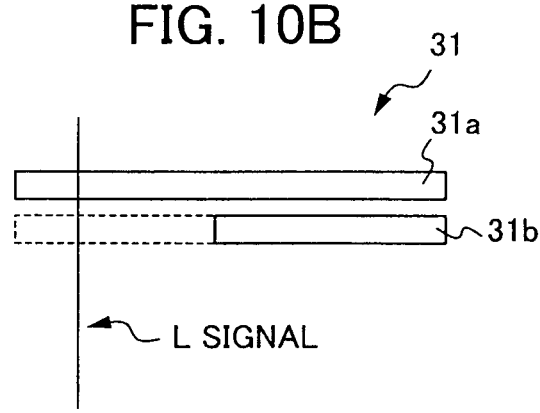
FIG. 10B is a plan diagram illustrating operation of the detection means.

FIG. 10A illustrates a state in which the zoom ring 21 has been turned to a barrel retraction position. When the zoom ring 21 is turned further in the direction of arrow E from the state in FIG. 9A, the first protrusion 25a of the retraction switch 25 passes through the V-slot portion 26b, sliding along the inclined surface of the V-slot portion 26b, and reaches the lock slot portion 26c. Because the retraction switch 25 is urged by the spring, the first protrusion 25a engages into the lock slot portion 26c. Turning of the zoom ring 21 is reliably locked by this engagement. Hence, the lens may be exchanged by operating the lens release button 5 and detaching the lens barrel 3 from the camera body 2. FIG. 4 shows the state in which the lens barrel 3 is retracted, corresponding to FIG. 10A.

To move the lens unit from the retracted state of FIG. 4 and FIG. 10A back to the region in which focusing is possible, the retraction switch 25 is moved to slide in the −Z direction. The locking of the zoom ring 21 is released by this sliding movement. Therefore, the zoom ring 21 may be turned in the opposite direction to arrow E, and the lens units 11, 12 and 13 may be moved to the region in which focusing is possible.

According to the present exemplary embodiment, the following advantageous effects are provided.

(1) When the zoom ring 21 is operated to turn in the region a in which focusing is possible, the first lens unit 11 and the second lens unit 12 move in the retraction direction. At the boundary (the W position in FIG. 2) between the region a in which focusing is possible and the region β in which focusing is not possible (the retraction region), the retraction switch 25 abuts against the abutting portion 26a, and therefore turning of the zoom ring 21 stops. Thus, further movement of the first lens unit 11 and the second lens unit 12 in the retraction direction is restricted. Therefore, the first lens unit 11 and second lens unit 12 do not strike against the third lens unit 13.

(2) When the retraction switch 25 is operated at the boundary between the region in which focusing is possible a and the region in which focusing is not possible β, the third lens unit 13 precedingly withdraws to the retracted position thereof. At this time, because the retraction switch 25 abuts against the pin portion 27a of the solenoid 27, turning of the zoom ring 21 is restricted, and the first lens unit 11 and second lens unit 12 do not move in the retraction direction. Therefore, the first lens unit 11 and second lens unit 12 do not strike against the third lens unit 13 in the retraction region β either.

—Variant Examples—

The exemplary embodiment described above is not limiting. Numerous modifications and improvements are possible, as illustrated below, and fall within the technical scope of the present invention.

(1) In the present exemplary embodiment, an encoder structure equipped with the fixed terminal 31a and the movable terminal 31b is formed to serve as the detection means 31 that detects a sliding operation of the retraction switch 25, but this is not a limitation. A structure that detects sliding of the retraction switch 25 optically is also possible.

(2) A structure that is provided with a protrusion in the sliding region of the retraction switch 25 and that detects the retraction switch 25 riding over the protrusion may also serve as the detection means 31.

(3) In the present exemplary embodiment, application to a camera is described, but this is not a limitation. The invention may be similarly applied to a portable telephone with an imaging function or the like.

The exemplary embodiment and variant examples may be combined and used as appropriate, but detailed descriptions are not given here. The present invention is not to be limited by the exemplary embodiment described above.

Explanation Of Reference Numerals

1: camera, 3: lens barrel, 11: first lens unit, 12: second lens unit, 13: third lens unit, 21: zoom ring, 25: retraction switch, 25a: first protrusion, 25b: second protrusion, 26: cam groove, 26a: abutting portion, 26b: V-slot portion, 26c: lock slot portion, 27: solenoid, 31: detection means

The invention claimed is:

1. A lens barrel comprising:
a first lens unit that is disposed at an object side in an optical system formed with a plurality of lenses and that is changeable between a first state, in which a spacing of the plurality of lenses along an optical axis direction of the optical system is a predetermined spacing, and a second state, in which the spacing of the plurality of lenses is narrower than in the first state;
a second lens unit that is disposed at an image side in the optical system relative to the first lens unit and that is capable of changing a focusing state of the optical system by moving along the optical axis of the optical system;
a restricting member that restricts the change of the first lens unit from the first state to the second state;
a motor that, in a state in which the change to the second state is restricted by the restricting member, moves the second lens unit toward the image side of the optical system,
wherein the restricting member is configured to expand and contract and includes a second restricting member that releases the restriction by contracting in association with a completion of the movement of the second lens unit by the motor;
a first operation member that, when operated, changes the first lens unit from the first state to the second state; and
a second operation member that, when operated in a state in which the change by the first operation member is restricted by the restricting member, starts the motor and moves the second lens unit.

2. The lens barrel according to claim 1, wherein
the first operation member changes the first lens unit from the first state to the second state by turning in a first direction about the optical axis of the optical system,
the restricting member includes a first restricting member,
the second operation member includes a first engaging portion, and
the restricting member is configured to restrict the turning of the first operation member in the first direction by the first engaging portion abutting against the first restricting member.

3. The lens barrel according to claim 2, wherein,
when the second operation member is operated in a second direction that is different from the first direction, the motor drives the second lens unit in association with the engagement of the first engaging portion with the first restricting member being released.

4. The lens barrel according to claim 2, wherein
the first restricting member is abuttable against the first engaging portion, and
the second restricting member is disposed to be offset in the first direction from a position of abutting between the first restricting member and the first engaging portion.

5. The lens barrel according to claim 4, wherein
the engagement of the first engaging portion with the first restricting member is releasable by operation of the second operation member in the second direction,
the second operation member includes a second engaging portion, and
after the engagement of the first engaging portion with the first restricting member is released, the second engaging portion engages with the second restricting member.

6. The lens barrel according to claim 5, wherein
the engagement of the second engaging portion with the second restricting member is released in association with the completion of the movement of the second lens unit toward the image side.

7. The lens barrel according to claim 6, wherein
the first restriction member includes a regulation portion that regulates the turning of the first operation member in the first direction by engaging with the first engaging portion after the engagement of the second engaging portion with the second restricting member is released.

8. An imaging device comprising a lens barrel according to claim 1.

* * * * *